United States Patent [19]

Takai

[11] 4,344,097

[45] Aug. 10, 1982

[54] LOCK MECHANISM FOR USE IN TAPE PLAYER

[75] Inventor: Kazuki Takai, Toda, Japan

[73] Assignee: Clarion Co., Ltd., Tokyo, Japan

[21] Appl. No.: 129,635

[22] Filed: Mar. 12, 1980

[30] Foreign Application Priority Data

Mar. 14, 1979 [JP] Japan .......................... 54/031643[U]
Mar. 14, 1979 [JP] Japan .......................... 54/031644[U]

[51] Int. Cl.³ ...................... G11B 15/00; G11B 19/18
[52] U.S. Cl. ..................................... 360/96.6; 360/93
[58] Field of Search ...................... 360/96.5, 96.6, 93, 360/132, 105; 242/197-200

[56] References Cited

U.S. PATENT DOCUMENTS

| | | | |
|---|---|---|---|
| 3,684,299 | 8/1972 | Clark | 360/93 |
| 3,729,202 | 4/1973 | Wakabayashi | 360/96.6 |
| 3,800,320 | 3/1974 | Murakami | 360/93 |
| 3,863,267 | 1/1975 | Yasukatsu | 360/93 |
| 3,867,722 | 2/1975 | Syohji | 360/96.6 |
| 3,877,075 | 4/1975 | Watanabe | 360/96.6 |
| 4,044,391 | 8/1977 | Takahashi | 360/96.5 |
| 4,087,844 | 5/1978 | Takahashi et al. | 360/96.6 |

Primary Examiner—Alfred H. Eddleman
Attorney, Agent, or Firm—Wallenstein, Wagner, Hattis, Strampel & Aubel

[57] ABSTRACT

A lock mechanism for use in a tape player for locking a slide member provided slidably on a tape player frame. The slide member is attached by a pivotally movable actuating member. The actuation member is provided with a pin adapted to engage with and disengage from a locking hook portion formed on the slide member and provided in association with an operating member for carrying out a locking operation. The operating member has an engaging projection engageable with said pin to actuate the same. The frame has a first guide portion for engaging with the pin and guiding the same into a locking position and a second guide portion for letting the engaging projection pass during the resetting of the operating member. The engaging projection has, on one face, two side edges for changing over operational directions for the pin and, on another face, a diagonal edge for forcing the pin into the second guide portion to let the projection pass thereover.

1 Claim, 11 Drawing Figures

LOCK MECHANISM FOR USE IN TAPE PLAYER

BACKGROUND OF THE INVENTION

1. Field of the Invention

This invention relates to a lock mechanism for use in a tape player, and more particularly to a lock mechanism for use in a tape player to hold a loaded tape pack in a playback position or holding operating members in their respective operative positions or inoperative positions.

2. Description of the Prior Art

In a tape player, it is essential to provide a lock mechanism for holding a loaded tape pack in a playback position or holding operating members such as operating levers in respective operative or inoperative positions. Therefore, there have been proposed various lock mechanisms for tape players. These known lock mechanisms, however, have such disadvantages that their locking and releasing operations are not always effected smoothly. In this respect, the known mechanisms generally comprise a locking projection formed on a member to be locked, a hook portion formed on a lock member for engaging with and disengaging from the projection and a separate actuator for actuating an operating portion of the lock member. In such a construction, a considerable force is required for the actuator and a complicated structure is needed to reverse the direction of loads for carrying out locking and releasing, i.e., to apply downward force for locking and an upward force for releasing. To obviate the disadvantage involved in such a mechanism for applying forces in opposite directions, there has been proposed a reversing spring. In this case, however, the spring must have a considerable arm length, which makes the structure bulky and requires so large operating force that a shock is possibly caused at the time of locking and releasing. By this reason, there has been proposed a structure wherein the hook portion of the lock member has oppositely formed diagonal operating portions and the actuator has an engaging member engageable with the hook portion so that when the actuator is depressed, the engaging member acts on the diagonal operating portions to displace the lock member out of the retreating course of the engaging member for letting the member pass therethrough and to reset the lock member thereafter for engaging, at the hook portion thereof, with the engaging member after the member reaches the hook portion. In this case, however, it is essential to form the diagonal portions integrally with the lock member. Therefore, the structure is not suitable for use in such a case where the operating portion is required to be separately used, i.e., a case of automatic ejection. In addition, since it is so designed that the locking is effected by once displacing the hook portion and then resetting it, the desired locking cannot be attained if either one of the displacement and resetting cannot be effected perfectly. Thus, there cannot be guaranteed a reliability of the operation. Furthermore, the structure requires, in general, an operating stroke larger than a stroke necessary for locking, e.g., an overpush. Where the loads applied to the lock member by the fulcrum of the lock member and by the actuator member are in the same direction, when the lock member is inclined in a direction to attain complete locking, a considerable force is required for releasing in a thrusting direction while the locking is easily releasable in a relief direction. Thus, there is a possibility of misoperation.

OBJECTS OF THE INVENTION

It is therefore an object of the present invention to provide a lock mechanism for use in a tape player which can obviate the aforesaid disadvantages involved in the known lock mechanism of the type.

It is a specific object of the present invention to provide a lock mechanism for use in a tape player which is capable of carrying out smooth and positive locking operation with a relatively simple structure without applying excessive load to a locking portion.

SUMMARY OF THE INVENTION

In accordance with the invention, there is provided a lock mechanism for use in a tape player, which comprises:
a frame of the tape player;
a slide member provided so as to slide relative to said frame;
an actuating member rotatably fitted to said slide member;
a lock-operating member provided in relation with said actuating member;
an engaging member provided on said actuating member so as to engage with and disengage from said slide member;
a projection formed on said operating member for operating said pin;
a first guide means for guiding said engaging member into a locking position;
a means for resetting said operating member; and
a second guide means for guiding said engaging member and letting said projection pass over said engaging member when said operating member is reset.

DESCRIPTION OF THE PREFERRED EMBODIMENT

Figure 1:
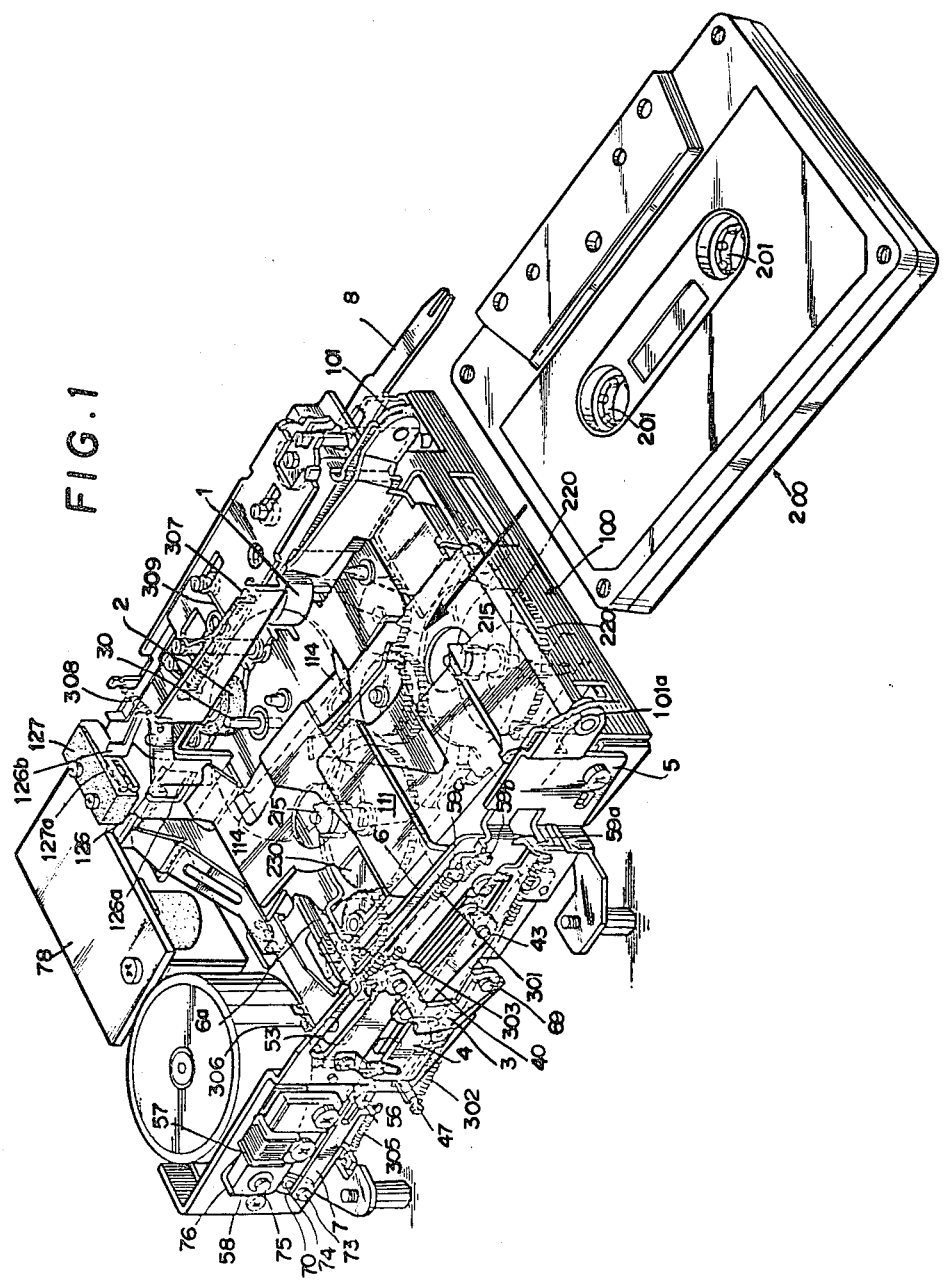
FIG. 1 is a perspective view of an entire structure of a tape player with a lock mechanism of the invention incorporated therein and a tape pack.

The invention will now be described referring to the drawings. A deck 100 bent downwardly at a forward portion thereof has a pivotal seat portion 101 at a forward, side portion thereof as illustrated in FIG. 1. A guide member 5 fixed to another side of the deck 100 also has a pivotal seat portion 101a at a forward position thereof opposite to the pivotal seat portion 101. A cassette receiving frame 10 bent upwardly at side portions thereof to define a guide portion therebetween is pivotally connected, at a forward portion thereof, to the portions 101 and 101a. The cassette receiving frame 10 has a construction as explodedly illustrated in FIG. 6. A rigid press member 111 and a thin resilient press member 112 are superposed and fixed to one side portion of the cassette receiving frame 10. The press member 111 is bent in an L-shape as illustrated in the figures, and the resilient press member 112 has a receiving resilient press portion 113 formed in the vicinity of a cassette receiving inlet and intermediate resilient press portions 114 and 114 formed at a portion extending beyond a tip end of the press member 111, so as to resiliently press a cassette 200 inserted into the guide portion against a base of the cassette receiving frame 10.

Figure 6:
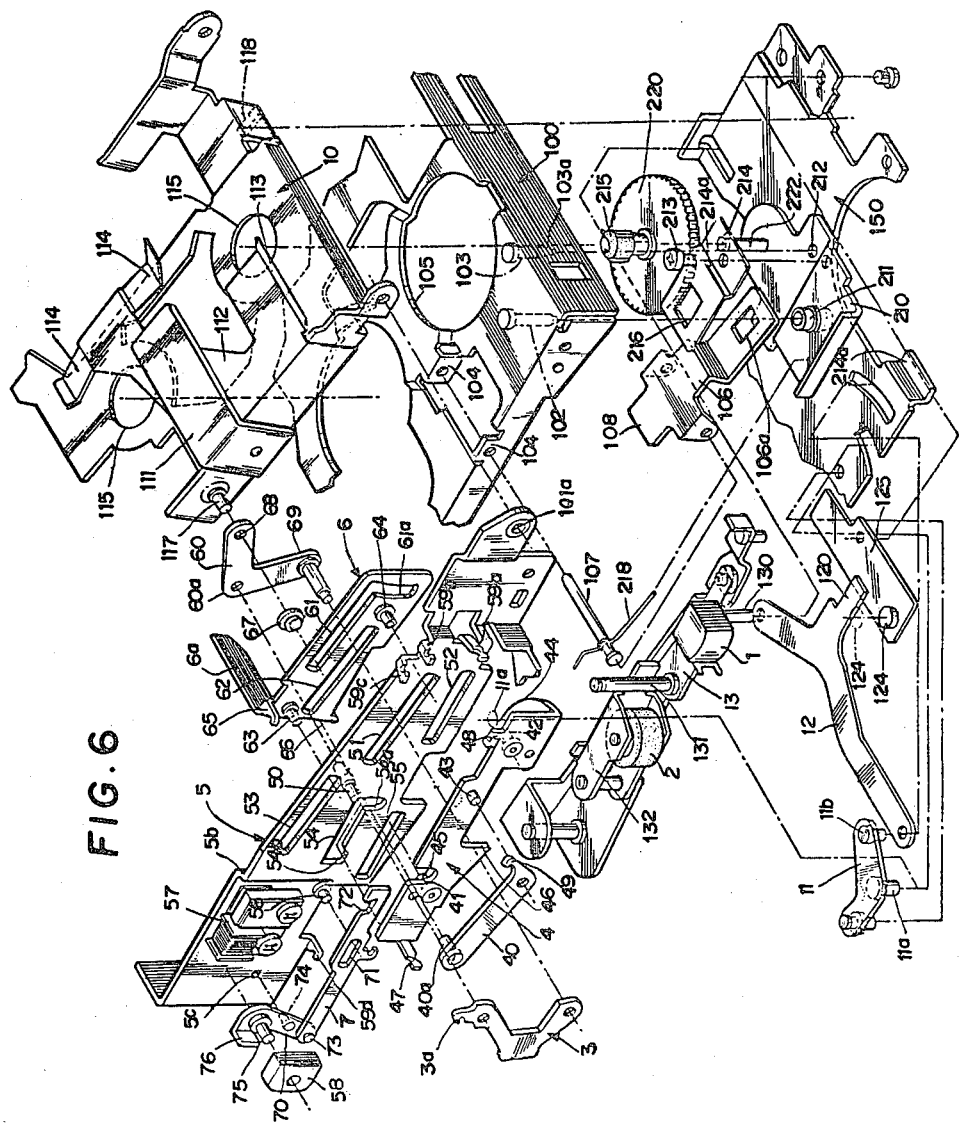
FIG. 6 is an exploded perspective view of main components of the tape player.
Figure 7:
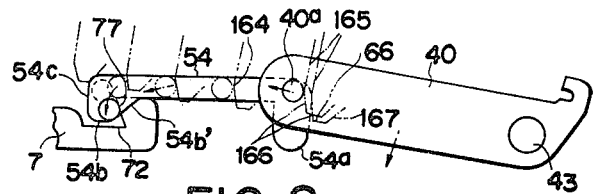
FIG. 7 is an explanatory side elevational view showing operational relations between an engaging member of an actuator, a guide slot and a lock portion in locking operation.
Figure 8:
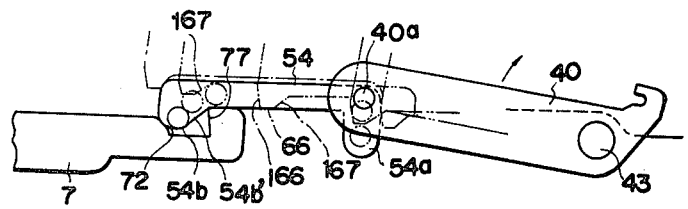
FIG. 8 is a similar explanatory side elevational view showing operational relations in unlocking operation.

The base portion of the cassette receiving frame 10 has openings 115 for receiving reel drive members 215 therein respectively. The cassette receiving frame 10 has, at a forward, side portion thereof, a hanging portion 118 bent downwardly and, at a rear, opposite side portion thereof, a pin 117. A tip end portion of the pin 117 engages with a first engaging slot 61 of a slide member 6 (also called a lock-operating member in the claims) which is attached to the guide member 5. As can be seen from FIG. 6, the pin 117 extends through an opening formed at one end portion of an L-shaped actuating member 60 which is interposed between the upright portion of the cassette receiving frame 10 and the slide member 6. A washer 67 is loosely fitted around the pin 117 between the L-shaped actuating member 60 and the slide member 6 so as to reduce friction between the slide member 6 and the actuating member 60. The first engaging slot 61 of the slide member 6 is crooked at a forward portion 61a thereof to be formed into an L-shape as illustrated in FIG. 6. The slide member 6 further has a second engaging slot 62 as illustrated in the figure, which is engaged with one end portion of a pin 50 provided at an intermediate position of the guide member 5 so as to project from opposite faces thereof. The end portion of the pin 50 is fitted in a pivotal hole 60a which is formed at a corner portion of the actuating member 60. A rear end portion of the slide member 6 is bent horizontally to form an L-shaped receiving portion 6a. A pin 64 engaging with a first guide slot 51 formed at a forward portion of the guide member 5 is provided at a position on a line extended from the second engaging slot 62 in a longitudinal direction thereof. Another pin 63 is further provided on the guide member 5 at a rear end portion thereof so as to engage with a third guide slot 53 formed at a rear, upper portion of the guide plate 5. The guide slots 51 and 53 gently slope up in rearward directions. An engaging projection 66 has relatively small scarfed edges 166 and 167 formed so as to oppose each other and an angled portion 164 between the scarfed edge 166 and a vertical edge 165 as illustrated in FIGS. 7 and 8. The engaging projection 66 is adapted to engage with and disengage from a pin 40a of another actuating member 40.

Figure 2:
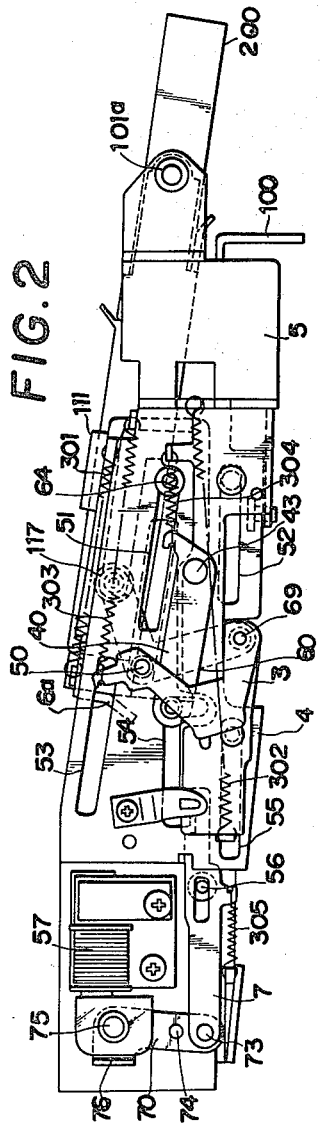
FIG. 2 is a side elevational view of the tape player and the tape pack at an early stage of its loading.
Figure 3:
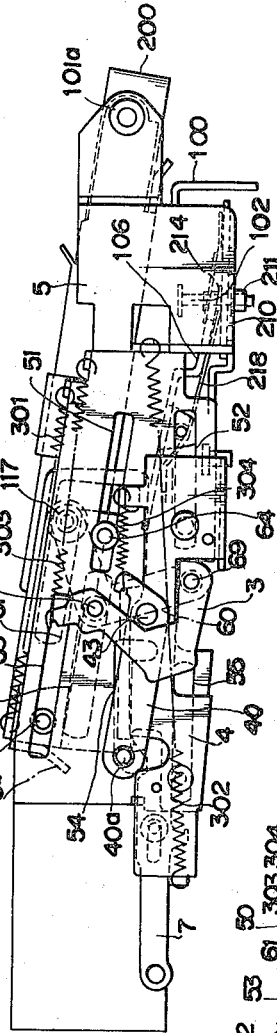
FIG. 3 is a similar side elevational view of the tape player and the tape pack which has been loaded into the rearmost position, keeping an inclined condition.
Figure 4:
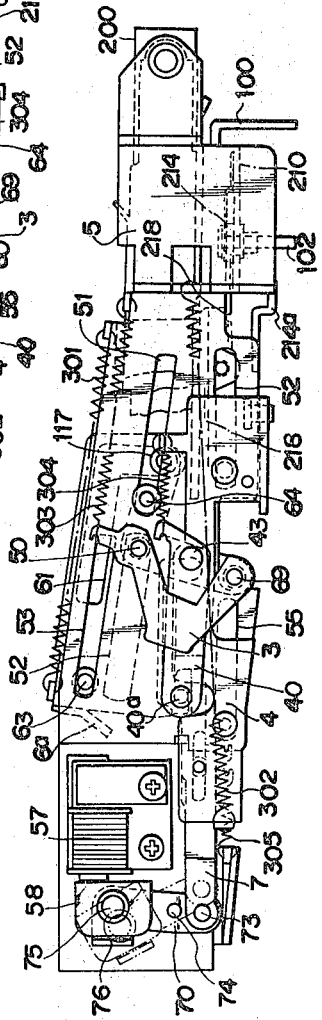
FIG. 4 is a similar side elevational view of the tape player and the tape pack which has been lowered onto a deck.

The guide member 5 further has, at a forward, lower portion thereof, a second guide slot and, at rear, lower portions thereof, fourth and fifth guide slots 54 and 55. The second guide slot 52 and the fifth guide slot 55 receive pins 42 and 45 therein, respectively, which are provided respectively at rear and forward portions of another slide member 4 acting as an operating member in the mechanism of this invention, attached to an outer, lower portion of the guide member 5, so as to guide the sliding of the slide member 4. The fourth guide slot 54 has guide portions 54a and 54b extending downwardly at forward and rearward portions of the slot 54 respectively and engaged with the pin 40a formed at a rear end portion of the actuating member 40 which is rotatably attached to the outside of the slide member 4 by a pivot 43. The slide member 4 has a cut out portion 41 formed at the upper edge thereof so as to allow the pin 40a engaged with the fourth guide slot 54 to move up and down around the pivot 43 and to lock the pin 40a at its retired position. The guide portion 54b has at its forward portion thereof a scarfed portion 54b' as illustrated in FIGS. 7 and 8. The slide member 4 has, at a forward portion thereof, a horizontal cam portion 44 in parallel with the base of the deck 100 and, at a lower portion thereof, a lock portion 46 projected downwardly. A spring 302 is provided between a spring rest 47 formed at a rear end of the slide member 4 and a first spring rest 59a on the guide plate 5, and another spring 304 is provided between a spring rest 48 formed at a forward, upper portion of the slide member 4 and a spring rest 49 formed at a forward portion of the actuating member 40, as illustrated in FIGS. 2 to 4.

A connecting member 69 provided at a lower portion of the L-shaped actuating member 60 is connected to a lower portion of an interlocking member 3 crooked at an intermediate portion thereof and disposed at a position outer than the actuating member 40. An upper portion of the interlocking member 3 is pivotally supported by a pin 50 of the guide member 5. A spring 303 is provided between a spring rest 3a formed so as to extend upwardly from such a pivotal support portion and a second spring rest 59b of the guide member 5. The guide member 5 has a stepped portion 5b at a rear portion thereof. An electromagnetic mechanism 57 is fixed at a position rearward of the stepped portion 5b, and a pin 56 is provided under the electromagnetic mechanism 57 so as to engage with a guide slot 71 of an interlocking link 7. A portion of the interlocking link 7, which is located forwardly of the stepped portion 5b and inside of the guide member 5, has a lock portion 72 formed in a recess so as to engage with the pin 40a of the actuating member 40 and having a diagonal edge crossing the scarfed portion 54b' as illustrated in FIGS. 7 and 8. A rear end portion of the interlocking link 7 is connected to a lower end of a magnetic member mounting member, or a regulating member 70 by a connecting member 73. A pivot 74 projected inwardly intermediate between the ends of the regulating member 70 is inserted in a hole 5c formed at a rear portion of the guide member 5. A shaft 75 provided at an upper portion of the regulating member 70 carries a magnetic member 58 so as to allow tilting of the member 58. A stopper 76 is formed in the vicinity of the shaft 75 so as to prevent the magnetic member 58 from being tilted too much around the shaft 75.

Figure 5:
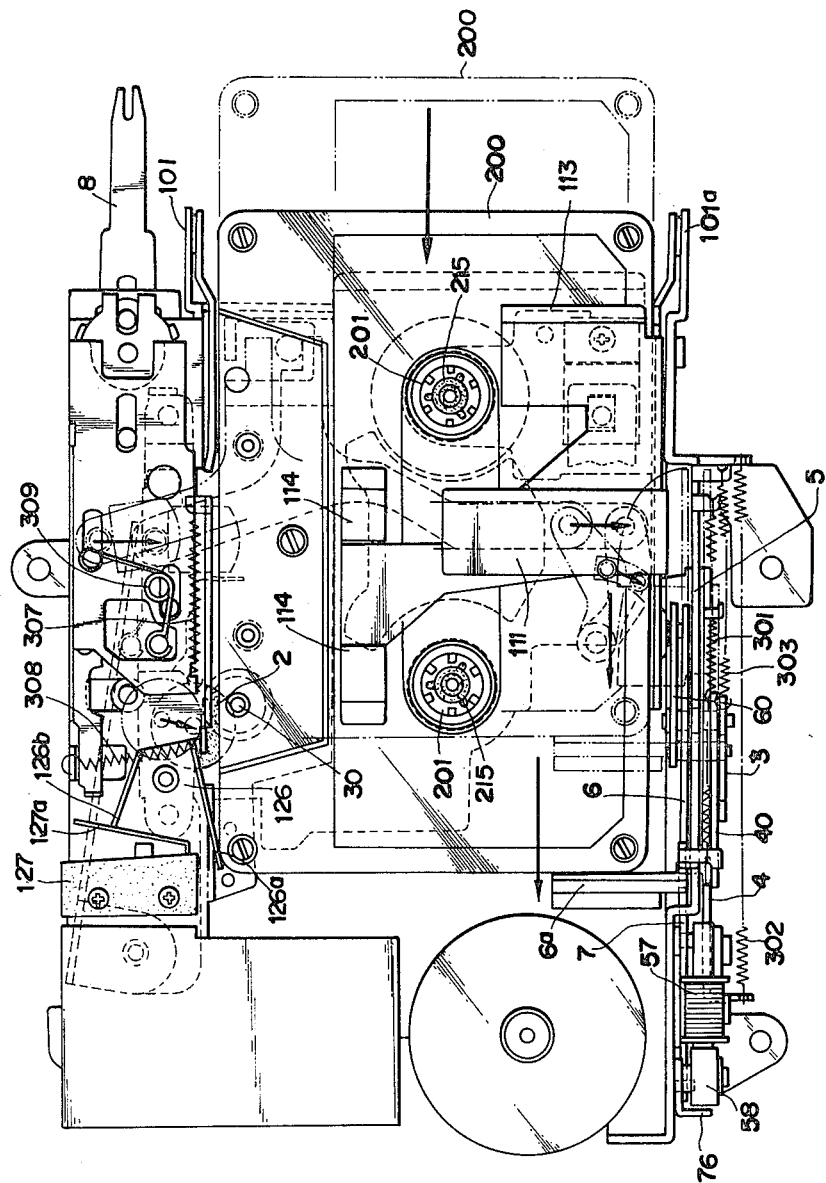
FIG. 5 is a plan view of the tape player and the tape pack illustrated in FIG. 4.

The cam portion 44 of the slide member 4 is engaged with a pin 11a provided at an intermediate portion of a rotating member 11 pivotally connected at one end thereof to an auxiliary deck 150 attached to the lower face of the deck 100. A tip end of the rotating member 11 is provided with a connecting member 11b for connecting one end of an interlocking member 12. Another end of the interlocking member 12 is connected to a pin 130 provided on a head plate 13 mounting a head 1 thereon. A tip end of a pinch roller holder 132 mounting a pinch roller thereon abuts against a shaft 131 provided so as to stand at an intermediate position of the head plate 13. The shaft 131 is provided with a spring 133 as illustrated in FIGS. 1 and 5. The spring 133 acts to normally push the head plate 13 and a free end of the pinch roller holder 132. The interlocking member 12 has a projected portion 120 formed at an intermediate position thereof. The projected portion 120 abuts against an engaging member 134 provided on a resilient member 125 which is attached at one end thereof to the lower face of the auxiliary deck 150. The resilient member 125 is disposed under the lower face of the cassette receiving frame 10 in relation with the hanging portion or operating portion 118 formed at a position suitably spaced from the pivotal seat portion 101, so that when the frame 10 is lowered, the resilient member 125 is pressed downwardly to release abutment between the engaging member 124 and the projected portion 120.

Two guide shafts 102 and 103 are on the lower face of the deck 100 at positions near the cassette receiving inlet. The guide shafts 102 and 103 are fitted in a reel base support 210 as illustrated in FIG. 6. More specifically, one of the guide shafts 102 is received in a cylindrical guide 211 provided on the reel base support 210 for guiding up and down movement of the support 210, while another guide shaft 103 is just inserted in an opening 212 for preventing the support 210 from being rotated when the support 210 is lowered and raised. A reel base 220 having a reel drive member 215 is rotatably supported at a shaft 222 thereof by one end of the reel base support 210. A lock plate 214 is fixed to the reel base support 210 by a screw 213. The lock plate 214 has an opening 216 at a position rear of a stepped portion 214a. A tip end portion of an operating member 106 pivotally connected, at one sided position, by a pin 107, to pivotal seats 104 and 104 formed at positions near a reel base mounting opening 105. More specifically, a square slot 106a formed at this tip end portion of the operating member 106 is superposed on the opening 216 so as to insert the guide 211 and the guide shaft 102 therethrough. A base end 108 of the operating member 106 is exposed over the deck 100 at a position interior of the pivotal seats 104 and 104 and located under the lower face of the cassette receiving frame 10.

A switch actuating member 126 is rotatably provided at the interior of the deck 100 and urged by a spring 308 so that a receiving portion thereof may project into a rear portion of a cassette receiving area. An operating portion 126b of the switch actuating member 126 is disposed in relation with an operating portion 127a of a switch 127. Another reel base 230 is provided so as to oppose to the reel base 220. A magnetic member 231 is provided on the reel base 230 and a reed switch is attached to the magnetic member for detecting rotation of the reel base 230. A signal of stop of the rotation of the reel base 230 operates a transistor on a printed board 78 as illustrated in FIG. 1 to open an electrical circuit for the electromagnetic mechanism 57.

Although the member 40a is provided in the form of a pin in the embodiment as illustrated, it may be a pawl or a roller.

The operation of the embodiment as mentioned above will now be explained. When a cassette 200 is inserted along the cassette receiving frame 10 with the rear portion raised around the pivotal seat portions 101 and 101a as illustrated in FIGS. 1, 2 and 3, the leading end, i.e., the rear end of the cassette 200 engages with the engaging portion 6a of the slide member 6 (referred to as a lock-operating member in the claims) to retreat the slide member 6 against the action of the spring 301. The slide member 6 is guided slantingly upwardly along the inclinations of the slots 51 and 53. Simultaneously, the engaging projection 66 engages with the pin 40a of the actuating member 40 and pushing the actuating member 40 rearwardly along the guide slot 54. As a result, the operating member, i.e., the slide member 4 connected to the actuating member 40 by the pin 43, is also pushed backwardly against the action of the spring 302. Thus, an energy for ejection is stored in the spring 302. During the retreat of the actuating member 40 and the slide member 4, the actuating member 40 rotates clockwise in the positions as illustrated in FIGS. 2 and 3 by action of the spring 304 provided between the actuating member 40 and the slide member 4.

Figure 9:
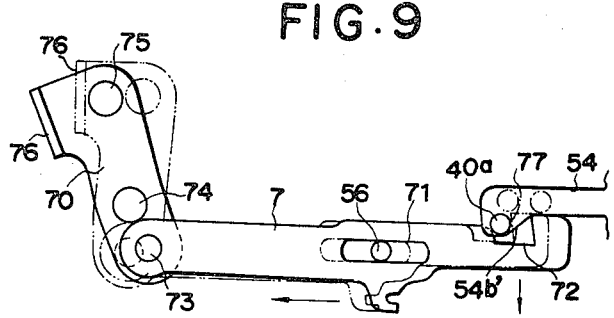
FIG. 9 is an explanatory side elevational view showing operational relations between a regulating member and a lock member.
Figure 10A:
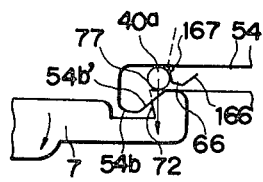
FIGS. 10A and 10B are explanatory side elevational views showing an operational relation just before locking and an operational relation at the time of locking, respectively.
Figure 10A:
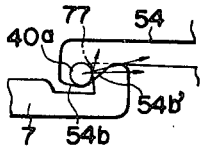
Figure 10A:
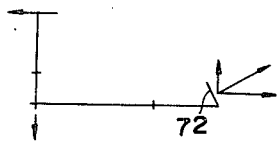
Figure 10B:

The course of the retreat of the pin 40a pushed backwardly until it reaches the rear end of the fourth guide slot 54 and the operational relation after it reaches the end are as analytically shown in FIGS. 7 and 9. Since the slide member 6 is pushed rearwardly along the guide slots 51 and 53 which is slanting upwardly in the rearward direction, the engaging projection 66 is raised gradually so that the pin 40a first depressed by the vertical edge higher than the diagonal edge 166 passes over the angled portion 164 and then comes to be depressed by the diagonal tow edge 166 lower than the angled portion 164 while the pin 40a is retreating in the guide slot 54. When the pin 40a reaches the portion 54b, the pin 40a is depressed by a lower end of the tow edge 166. Since the pin 40a is thus depressed by the tow edge 166 lower than the angled portion 164, the pin 40a is automatically brought into the portion 54b. More specifically, the projection 40a makes a detour around the locking projection 77 of the interlocking link 7 locked electromagnetically (the electromagnetic mechanism 57 is energized because the switch 127 has been closed by the switch operating member 126 which has been actuated by the tip and of the cassette 200 loaded in the cassette receiving frame 10) in a position forward of the forward diagonal edge 54b' of the recessed portion 54b as illustrated in FIG. 7. The pin 40a is then once pushed into the interior of the recessed portion 54b and engaged with the lower portion of the inclined edge 54b' and the upper portion of the locking projection 77 to establish a locking condition as illustrated in FIG. 7. More particularly, when the regulating member 70 rotatable around the pin 74 is locked in a position as illustrated by a phantom line in FIG. 9, the connecting member 73 at the base portion of the intermediate member 7 is kept substantially in a position. In this case, even though the rotation range of the regulating member 70 having a relatively small length is large, the relatively long interlocking member 7 is substantially not rotated due to the movement of the connecting member 73. Thus, a stable locking condition is obtained by small operating strokes of these members since the pin 40a is pulled by the spring 304. At the time of locking of the pin 40a, though the projected portion 77 of the interlocking member 7 is depressed downwardly and a rotating force is caused in a direction of the arrows shown in FIG. 10A, the force is effectively absorbed at the connecting member 73 located at a position and a pivot 74 positioned in a direction of rotation around the pin 56. Thus, the rotating force will never affect the magnetic member 58 absorbed by the electromagnetic mechanism. After the locking condition has been established, the engaging projection 66 of the slide member 6 passes over the pin 40a and retreats until the vertical portion 61a of the first engaging slot 61 of the slide member 6 reaches the pin 117. When the pin 117 is positioned at the vertical portion 61a, the interlocking member 3 rotates clockwise in FIG. 3 around the connecting member 69 to lower the rear portion of the cassette receiving frame 10 onto the deck 100 through the pin 63 for providing a playback position.

When the frame 10 with the cassette held thereon is lowered onto the deck 100, the operating portion 118 of the frame 10 depressed the resilient member 125 and the projection 120 locked by the locking member 124 of the resilient member 125 is released. As a result, the head plate 13 is advanced by the action of the spring 309 so that the head 1 and the pinch roller 2 are pressed against a tape of the cassette 200 loaded in the playback position. Thus, the tape runs between the pinch roller 2 and a capstan 30 by a motor 31 energized upon closing the switch 127. Since the operation of the head plate 13 is carried out after detection of the cassette 200 set in the playback position by the operating portion 118 and the resilient member 125, the head plate 13 is surely operated at an appropriate timing and there is no fear that the head plate 13 is operated before the cassette 200 has not been set in the playback position. Upon lowering of the frame 10 onto the playback position, the base portion 108 of the operating member 106 raised above the deck 100 is depressed by the bottom of the frame 10. As a result, the forward portion having the opening 106a is moved upwardly to raise the reel base support 210, the reel base 22 on the support 210 and the reel drive member 215 through the locking member 214. More specifically, the reel drive member 215 located at the cassette receiving inlet is adapted to be in a retired position so as not to hinder the cassette 200 at the time of cassette loading and to be raised for engagement with a reel of the cassette 200 when the cassette is set in the position. This mechanism can reduce the thickness of the entire structure.

When the tape feeding is stopped by a tape end detecting signal, or by an operation for fast feeding or rewinding, etc. in relation with the reel base 230, the electromagnetic mechanism 57 is deenergized by a detection signal from the reed switch as mentioned above. The adsorption by the electromagnetic mechanism 57 is thus lost and the slide member 4 is reset by the force stored on the spring 302. The regulating member 70 also returns to its position shown by a solid line from the position shown by the phantom line, moving the interlocking member 7 conjointly while allowing slight rotation thereof. In the resetting of the slide member 4, the pin 40a gradually moves along the forward edge 54b' of the recessed portion 54b as illustrated in the left of FIG. 8. In the course, while the lock projection 77 of the interlocking link 7 projected from the edge 54b' as illustrated in FIGS. 7 and 9 is pushed back into within the edge 54b' against a relatively weak force of the spring 305, the slide member 4 returns along the fourth guide slot 54 to a position where the pin 40a reaches the upper portion of the recessed portion 54a as shown by a solid line in FIG. 8 and held in the position by the action of the spring 304. On the other hand, the slide member 6 having the engaging projection 66 is also reset by the action of the spring 301. At this time, the projection 66 descends gradually and it hits against the pin 40a when it comes across the pin 40a held at the upper portion of the recessed portion 54a. More particularly, the pin 40a engages with the forward slanting edge 167 of the projection 66 so that the free end of the actuating member 40 where the pin 40a is provided is rotated against the action of the spring 304 to depress the pin 40a into the recessed portion 54a for allowing the projection 66 to pass therethrough. Thus, when the slide member 6 (and the projection 66) advances sufficiently, the projection 66 engages, at the vertical edge 165, with the pin 40a after the latter has passed over the forward slanting edge 166 and the angled portion 164, as the actuating member 40 is raised again by the action of the spring 304. Therefore, the interlocking member 7 which has once assumed the position illustrated in FIG. 9 is reset into the position of the phantom line by the action of the spring 305. The regulating member 70 is then held upright to press the magnetic member against the electromagnetic mechanism 57 for a solenoid operation.

At the beginning of the retreating of the slide member 4 upon release of the pin 40a, the cam portion 44 acts on the pin 11a so as to retire the head plate 13 from an advanced position where the head and the pinch roller are engaged with the cassette 200 through the interlocking member 12. Then, the locking portion 46 acts on the connecting member 69 of the L-shaped operating member 60 to rotate the operating member 60 counterclockwise. Thus, the rear portion of the cassette receiving frame 10 connected through the hole 68 is raised. In the course of the retreat of the head plate 13, the projection 120 of the interlocking member 12 returns to its original position. On the other hand, the resilient member 125 is released from depression by the operating portion 118 upon rising of the cassette receiving frame 10. The projection 120 is brought into engagement with the locking projection 124 of the resilient member 125 reset from its depressed position. Thus, the head plate 13 is positively held at a retired position under the conditions where the rear portion of the cassette or the cassette receiving frame is raised. When the frame 10 is raised completely, the connecting member 69 reaches the upper end of the vertical portion 61a of the first slot 61. It is apparent that the slide member 6 can be reset in the position by the spring 301. According to the resetting of the slide member 6, the connecting member 69 is received in a horizontal portion of the slot 61 and the cassette 200 is pushed forwardly by the rear engaging portion 6a.

Although the tape player of the illustrated embodiment employs a diagonal loading system, the invention may also be applied to another type of tape player.

In accordance with the present invention locking and releasing can be effected smoothly by a small force due to the specific relation between the small engaging projection formed on the operating member and the first and the second guide slot formed on the tape player frame. The lock mechanism of the invention can attain desired operation free from troubles such as incomplete locking or misoperation by a simple operation without employing a complicated structure and large load as required in the known art.

Further according to the invention, the movements of the members caused at the time of locking and releasing can be extremely small, as apparent from FIG. 9, due to employment of the regulating member and the locking member. Thus, the space efficiency for the lock mechanism can be improved very much. Furthermore, since the locking member is adapted to disengage from the engaging pin for releasing, the resetting operation can be effected very smoothly. Since the regulating member after released is pulled back by the spring provided on the locking member and pressed against the electromagnetic mechanism, even an adsorption type electromagnetic mechanism can be employed with a sufficient reliabiity. By making the arm ratio variable employing the regulating member and the adsorbing member, a high locking force can be obtained by a relatively weak adsorption force. Moreover, the lock mechanism is so adapted that the locking member is retracted, the inclination of the locking portion can be increased to enhance a locking force in a rotating direction without loosing smoothness in unlocking operation. Further, since the rotating force is absorbed by the support portion, it will not influence the adsorption by the electromagnetic mechanism. Thus, the lock mechanism of the present invention can attain a desired locking operation with a compact structure.

I claim:

1. In a tape player including a frame; the improvement in lockable mechanisms responsive to the insertion of a tape cassette into the player, said mechanisms comprising a slide member provided so as to slide relative to said frame; an actuating member rotatably fitted to said slide member; a lock-operating member mounted for movement relative to said actuating member in response to the insertion of a cassette into the tape player; an engaging member provided on said actuating member so as to engage with and disengage from said slide member; a projection formed on said lock-operating member for operating said engaging member, said projection being adapted to engage with and move said engaging member when said engaging member is operated in one direction; first guide means for guiding said engaging member into a locking position; means for resetting said lock-operating member; and a second guide means for guiding said engaging member and letting said projection pass over said engaging member when said lock-operating member is reset, said projection having on one side face thereof tow edges for changing over a guiding direction for the engaging member and, on another side face thereof, an inclined edge for pushing said engaging member into said second guide means to reset said projection.

* * * * *